US006907494B2

United States Patent
Arimilli et al.

(10) Patent No.: US 6,907,494 B2
(45) Date of Patent: *Jun. 14, 2005

(54) METHOD AND SYSTEM OF MANAGING VIRTUALIZED PHYSICAL MEMORY IN A MEMORY CONTROLLER AND PROCESSOR SYSTEM

(75) Inventors: Ravi Kumar Arimilli, Austin, TX (US); John Steven Dodson, Pflugerville, TX (US); Sanjeev Ghai, Round Rock, TX (US); Kenneth Lee Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 239 days.

This patent is subject to a terminal disclaimer.

(21) Appl. No.: 10/268,728

(22) Filed: Oct. 10, 2002

(65) Prior Publication Data

US 2004/0073765 A1 Apr. 15, 2004

(51) Int. Cl.[7] .............................................. G06F 12/00
(52) U.S. Cl. ............................ 711/5; 711/4; 711/100; 711/114; 711/200; 711/202; 711/209; 711/161; 711/162
(58) Field of Search ................................ 711/4–5, 100, 711/114, 161–162, 200, 203, 209

(56) References Cited

U.S. PATENT DOCUMENTS

| | | | | |
|---|---|---|---|---|
| 5,404,478 A | * | 4/1995 | Arai et al. ................... 711/206 |
| 5,615,352 A | * | 3/1997 | Jacobson et al. ........... 711/114 |
| 5,819,310 A | * | 10/1998 | Vishlitzky et al. .......... 711/114 |
| 5,926,836 A | * | 7/1999 | Blumenau ................... 711/162 |
| 6,044,445 A | * | 3/2000 | Tsuda et al. ................ 711/163 |
| 6,141,729 A | * | 10/2000 | Ishida et al. ................ 711/114 |
| 6,223,269 B1 | * | 4/2001 | Blumenau ................... 711/202 |
| 6,243,790 B1 | * | 6/2001 | Yorimitsu ................... 711/112 |
| 6,269,431 B1 | * | 7/2001 | Dunham ...................... 711/162 |
| 6,282,610 B1 | * | 8/2001 | Bergsten ..................... 711/114 |
| 6,341,341 B1 | * | 1/2002 | Grummon et al. .......... 711/162 |
| 6,356,991 B1 | * | 3/2002 | Bauman et al. ............. 711/209 |
| 6,434,681 B1 | * | 8/2002 | Armangau ................... 711/162 |
| 6,442,649 B1 | * | 8/2002 | Anderson .................... 711/114 |
| 6,442,650 B1 | * | 8/2002 | Bachmat et al. ............ 711/114 |
| 6,457,139 B1 | * | 9/2002 | D'Errico et al. ............... 714/5 |
| 6,473,847 B1 | * | 10/2002 | Kamiya ...................... 711/171 |
| 6,662,289 B1 | * | 12/2003 | Ang ............................ 711/202 |
| 6,665,787 B2 | * | 12/2003 | Franaszek et al. .......... 711/206 |

* cited by examiner

Primary Examiner—Matthew Anderson
Assistant Examiner—Zhuo H. Li
(74) Attorney, Agent, or Firm—Casimer K. Salys; Dillon & Yudell LLP (57) ABSTRACT

A processor contains a move engine and a memory controller contains a mapping engine that, together, transparently reconfigure physical memory to accomplish addition, subtraction, or replacement of a memory module. A mapping engine register stores current and new real addresses that enable the engines to virtualize the physical address of the memory module being reconfigured and provide the reconfiguration in real-time through the use of hardware functionality and not software. Using the current and new real addresses to select a source and a target, the move engine copies the contents of the memory module to be removed or reconfigured into the remaining or inserted memory modules. Then, the real address associated with the reconfigured memory module is re-assigned to the memory module receiving the copied contents, thereby creating a virtualized physical mapping from the addressable real address space being utilized by the operating system into a virtual physical address space. During the process of moving the memory contents, the mapping engine responds to Write memory requests addressed to either the current or new real address space. As will be appreciated, a memory module can be inserted, removed or replaced in physical memory without the operating system having to direct and control the reconfiguration of physical memory to accomplish the physical memory change.

19 Claims, 4 Drawing Sheets

METHOD AND SYSTEM OF MANAGING VIRTUALIZED PHYSICAL MEMORY IN A MEMORY CONTROLLER AND PROCESSOR SYSTEM

RELATED APPLICATIONS

The present invention is related to the subject matter of the following commonly assigned, copending U.S. patent applications: Ser. No. 10/268,743 entitled "Method and System of Managing Virtualized Physical Memory in a Multi-Processor System" and filed Oct. 10, 2002; Ser. No. 10/268,741 entitled "Method and System of Managing Virtualized Physical Memory in a Data Processing System" and filed Oct. 10, 2002. The content of the above-referenced applications is incorporated herein by reference.

BACKGROUND OF THE INVENTION

1. Technical Field

The present invention relates in general to data processing and in particular to managing physical memory in a data processing system. Still more particularly, the present invention relates to a method and system for managing physical memory in a data processing system autonomously from operating system control.

2. Description of the Related Art

In computer systems it is customary that there be one-to-one correspondence between the memory address produced by the processor and a specific area in the physical memory of the system. This limits the operating system and applications to an address space determined by the actual physical memory installed in the system. Moreover, many modern computer systems run multiple concurrent tasks or processes, each with its own address space. It would be expensive to dedicate a full complement of memory to each task and the operating system, especially since many processes use only a small part of their address spaces at any given time. Modem computer systems have overcome this limitation through the use of virtual memory, which implements a translation table to map program addresses (or effective addresses) to real memory addresses. Virtual memory allows a program to run on what appears to be a large, contiguous, physical-memory address space, dedicated entirely to the program. In reality, however, the available physical memory in a virtual memory system is shared between multiple programs or processes. Effective addresses used in a process are translated by a combination of computer hardware and software to real addresses of physical memory. This process is called memory mapping or address translation.

In a virtual memory system, the allocation of memory is most commonly performed by the operating system software (OS). It is a function of the operating system to ensure that the data and code a program is currently using is in main memory and that the translation table can map the effective addresses to the real addresses correctly. This requires an interrupt of the instruction sequence so that the privileged kernel code can allocate physical memory to the area being accessed so that normal program flow can continue without error. This interrupt and the kernel processing to allocate physical memory requires a significant amount of processing time and upsets the normal pipelining of instructions through the CPU.

The burden on the operating system of managing physical memory increases when the physical memory is reconfigured while the computer system is in operation. In cases where the physical memory size is increased or decreased or when a memory module is replaced during system operation (for example, when a failure occurs in a memory module requiring replacement), the OS is required to temporarily interrupt the task being processed, modify the system memory configuration information in the translation table, and use the changed physical addresses to store data from the bad memory device out to disk and then reconfigure the remaining memory devices. If a memory device has been removed, the OS must invalidate the physical address space of the removed device and maintain the invalidated address space so that it can not be used, essentially leaving an unavailable block of space within the addressable space of the memory system. The operating system must map logical addresses to physical addresses to avoid pages with bad memory locations. These problems increase the overhead of the OS and complicate the control of memory. What is needed is a method and system for physical memory control capable of solving the above-described problems of the prior art and quickly and efficiently implementing dynamic reconfiguration of physical memory as required.

SUMMARY OF THE INVENTION

In accordance with a preferred embodiment, a method and system of managing virtualized physical memory in a memory controller and processor system is provided. The computing system has multiple processing devices for generating memory accesses containing real addresses associated with memory locations of a physical memory system for reading and writing of data thereto, and a plurality of memory modules in the physical memory system for storing the data as a plurality of memory blocks, each memory block comprising contiguous bytes of physical memory. The system includes a plurality of memory controllers, wherein each memory controller of the plurality of memory controllers has one or more memory modules of the plurality of memory modules coupled thereto, and wherein each memory controller of the plurality of memory controllers responds to memory accesses by writing and reading memory blocks stored within the one or more of the memory modules coupled thereto. A first and second registers within a first and second memory controller of the plurality of memory controllers, respectively, has a first field storing a current real address corresponding to a first and second memory module, respectively of the plurality of memory modules coupled thereto and a second field storing a new real address corresponding to the first and second memory modules, respectively. The system includes a move engine that, in response to a notification that a configuration of the first and second memory modules is being modified, copies the plurality of memory blocks from the first memory module to the second memory module based on the current real addresses of the first and second memory modules. A first mapping engine within the first memory controller is provided that enables the first memory controller to respond to memory accesses addressed to the current real address stored in the first register during a time period that the move engine is copying the plurality of memory blocks from the first memory module to the second memory module and that enables the first memory controller to only respond to memory accesses addressed to the new real address stored in the first register after the time period that the move engine is copying the plurality of memory blocks from the first memory module to the second memory module. A second mapping engine within the second memory controller is provided that enables the second memory controller to respond to memory accesses addressed to the current real address stored in the second register during a time period that the move engine is copying the plurality of memory blocks from the first memory module to the second memory module and that enables the second memory controller to only respond to memory accesses addressed to the new real address stored in the second register after the time period that the move engine is copying the plurality of memory blocks from the first memory module to the second memory module.

In an alternative preferred embodiment, the first and second mapping engines enable their respective memory controllers to respond to write memory accesses addressed to either the current real address or the new real address stored in their respective registers during a time period that the move engine is copying the plurality of memory blocks from the first memory module to the second memory module.

In another alternative preferred embodiment, the first memory module is removed from the physical memory system after the second mapping engine enables the second memory controller to only respond to memory accesses addressed to the new real address stored in the second register after the time period that the move engine is copying the plurality of memory blocks from the first memory module to the second memory module.

In still another alternative preferred embodiment, the new real address stored in the second register is equivalent to the current real address stored in the first register and the new real address stored in the first register is outside the current addressable space of the physical memory system.

In yet another alternative preferred embodiment, the second memory module is inserted into the physical memory system before the move engine copies the plurality of memory blocks from the first memory module to the second memory module.

In another alternative preferred embodiment, the new real address stored in the second register is equivalent to the current real address stored in the first register and the new real address stored in the first register is within the current addressable space of the physical memory system.

In still another alternative preferred embodiment, the first and second mapping engines enable their respective memory controllers to respond to read memory accesses addressed to only the current real address stored in their respective registers during a time period that the move engine is copying the plurality of memory blocks from the first memory module to the second memory module.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

Figure 1:
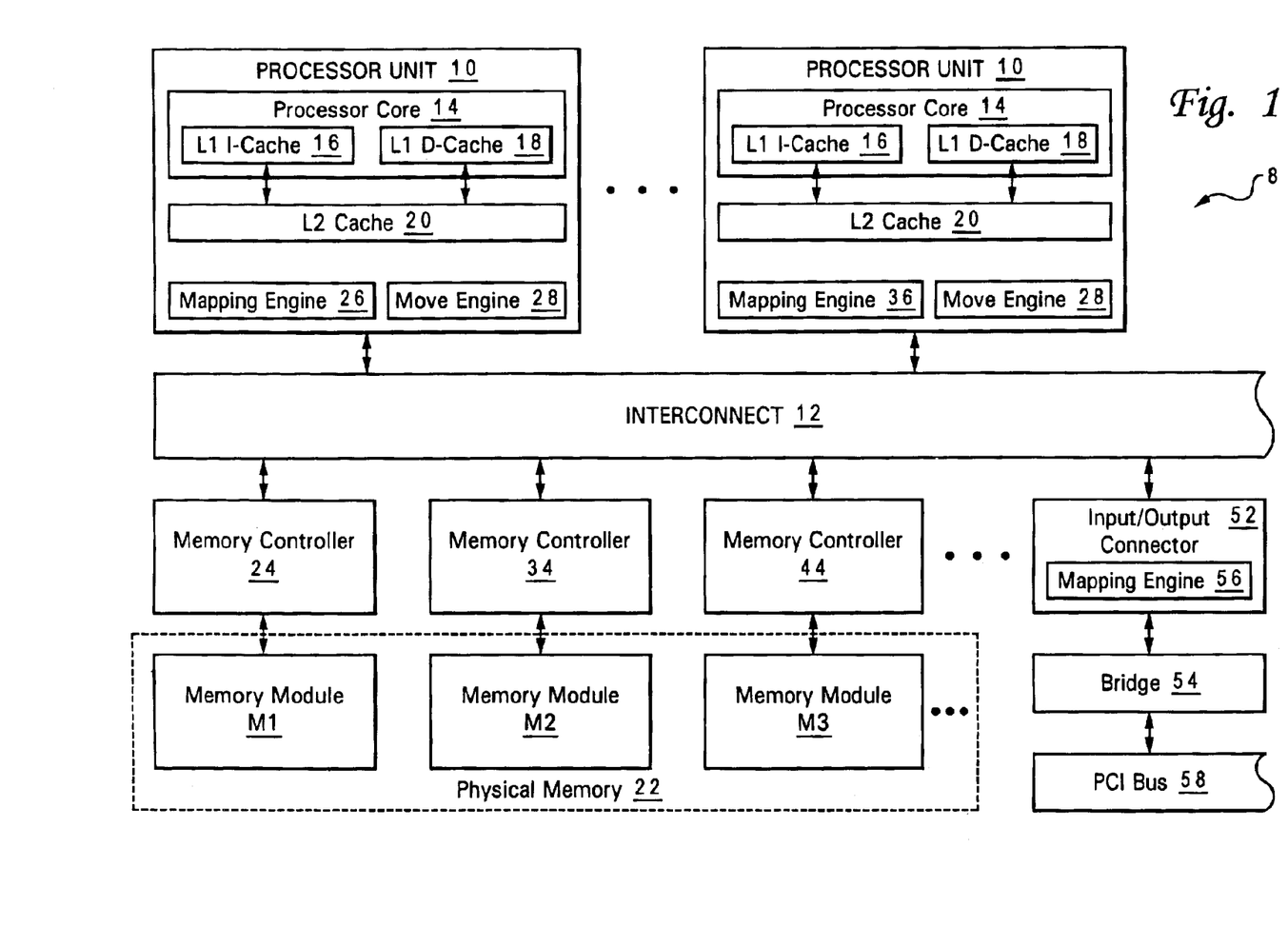
FIG. 1 depicts a data processing system implemented in accordance with a preferred embodiment of the present invention.

With reference now to the figures and in particular with reference to FIG. 1, there is illustrated a high-level block diagram of a multiprocessor (MP) data processing system that supports memory management of virtualized physical memory, in accordance with one embodiment of the present invention. As depicted, data processing system 8 includes a number (e.g., 64) of processing units 10 coupled for communication by a system interconnect 12. Each processing unit 10 is an integrated circuit including one or more processor cores 14. In addition to the registers, instruction flow logic and execution units utilized to execute program instructions, each of processor cores 14 includes associated level one (L1) instruction and data caches 16 and 18, which temporarily buffer instructions and operand data, respectively, that are likely to be accessed by the associated processor core 14.

As further illustrated in FIG. 1, the memory hierarchy of data processing system 8 also includes the physical memory 22, comprising one or more memory modules (shown as memory modules M1, M2 and M3), which form the lowest level of volatile data storage in the memory hierarchy, and one or more lower levels of cache memory, such as on-chip level two (L2) caches 20, which are utilized to stage instructions and operand data from physical memory 22 to processor cores 14. As understood by those skilled in the art, each succeeding lower level of the memory hierarchy is typically capable of storing a larger amount of data than higher levels, but at higher access latency. As shown, physical memory 22, which is interfaced to interconnect 12 by memory controllers 24, 34 and 44, may store operand data and portions of or more operating systems and one or more application programs. Memory controllers 24, 34 and 44 are coupled to corresponding memory modules M1, M2 and M3, respectively (although shown only coupled to a single memory module each, it should be understood that each memory controller can control a plurality of memory modules of memory system 22). A set comprising all or part of the memory modules M1, M2 and M3 constitutes a set of physical memory resources for the operating system and applications of the machine.

System interconnect 12, which can comprise one or more buses, a switch fabric, or other interconnect architecture, serves as a conduit for communication among the devices (e.g., processing units 10, memory controllers 24, 34 and 44, etc.) coupled to system interconnect 12. A typical transaction on system interconnect 12 begins with a request, which may include a transaction field indicating the type of transaction, one or more tags indicating the source and/or intended recipient(s) of the transaction, and an address and/or data. Each device connected to system interconnect 12 preferably snoops all transactions on system interconnect 12 and, if appropriate, responds to the request with a snoop response. These actions may include sourcing data on system interconnect 12, storing data provided by the requesting snooper, invalidating cached data, etc. Input/output connector 52 is also coupled to interconnect 12 and provides a conduit for communications among the other devices coupled to interconnect 12 and the external devices coupled to PCI bus 56 through bridge 54.

Data processing system 8 utilizes a virtual memory system, which implements a translation table to map program addresses (or effective addresses) to real memory addresses. The virtual memory system allows the available physical memory to be shared between multiple programs or processes. Processing units 10 allow the address space of the processing units ("logical address space") to have a different size than the available physical memory 22 by providing an address translation mechanism that translates the effective addresses (EA) to physical addresses (PA) that refer to locations in actual physical memory. This virtual memory system also allow multiple programs to reside simultaneously in system memory without each needing to know the location of its physical base address. Rather, such multiple programs need only know their logical base address. Moreover, rather than attempting to maintain a translation or mapping for each possible effective address, the virtual memory system divides effective and physical memory into blocks. In many systems, these blocks are fixed in size and referred to as sections or pages. The addresses within an individual page all have identical upper-most bits. Thus, a memory address is the concatenation of a page number, corresponding to the upper bits of the address, and a page offset, corresponding to the lower bits of the address.

Data structures are typically maintained in physical memory to translate from effective page numbers to real page addresses. These data structures often take the form of conversion tables, normally referred to as segment tables and page tables. A segment table is indexed by an effective page address or number, and generally has a number of entries corresponding to pages in the effective address space. Each entry is a mapping of a specific page number or effective page address to a virtual page address. A page table is indexed by a virtual page address or number, and generally has a number of entries corresponding to pages in the virtual address space. Each entry is a mapping of a specific page number or virtual page address to a real page address.

Effective-to-real address translation is performed in processor units 10 using a specialized hardware cache (not shown), referred to as an address translation cache or as a translation lookaside buffer (TLB), dedicated to translations. A TLB is a fast and small static memory for storing the most frequently referenced entries from the page table. It typically has a fixed number of entries. When processing a memory request, a computer first attempts to find an appropriate address translation in the TLB. If such an address translation is not found, a page table is automatically accessed to retrieve the proper translation.

Those skilled in the art will appreciate that data processing system 8 can include many additional unillustrated components, such as I/O adapters, interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to data processing systems of any architecture and are in no way limited to the generalized MP architecture illustrated in FIG. 1.

Figure 2:
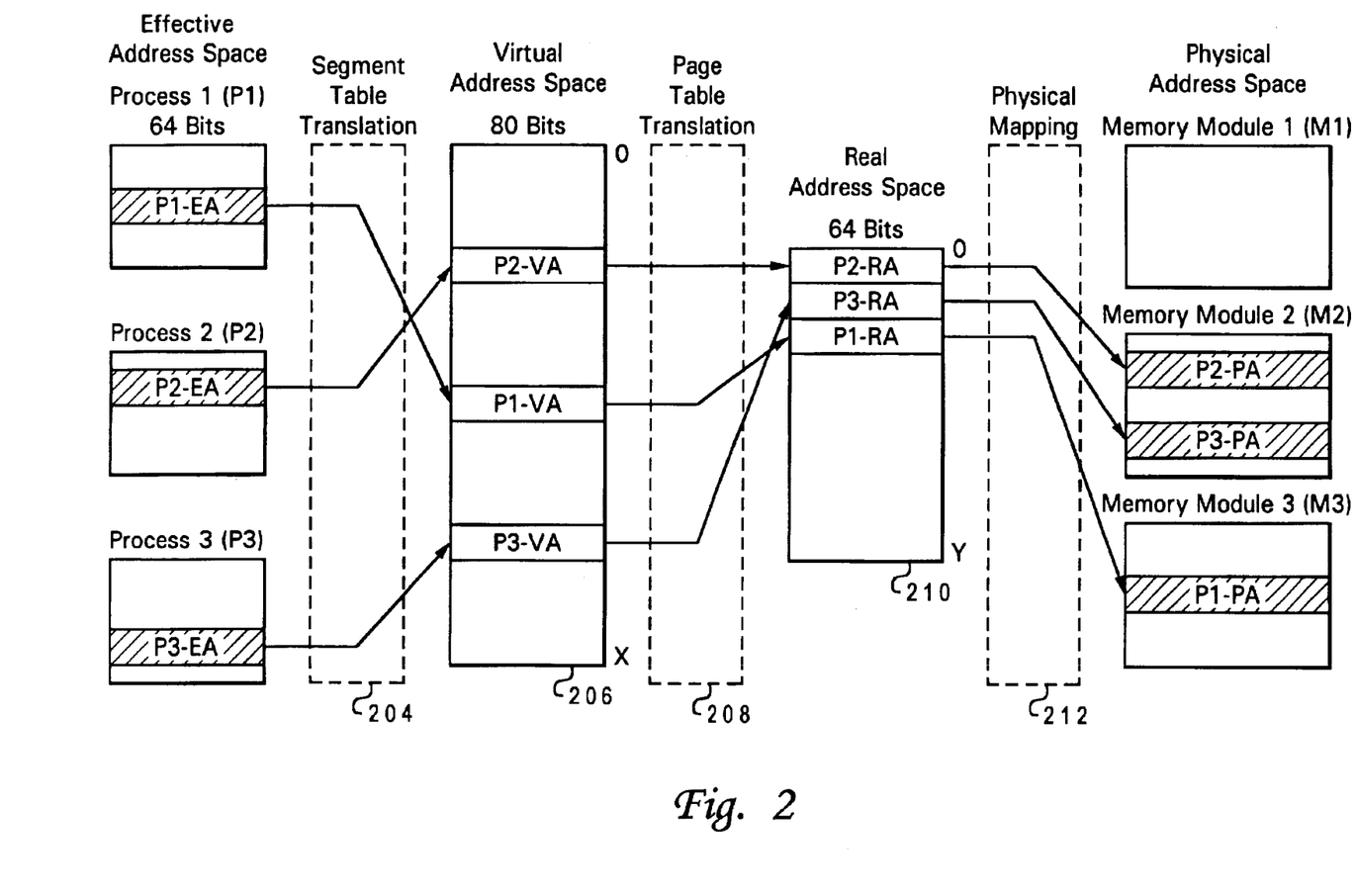
FIG. 2 shows a block diagram representation of the memory address translation process for the memory system of the data processing system shown in FIG. 1, in accordance with a preferred embodiment of the present invention.

With reference now to FIG. 2, shown is a depiction of the memory mapping function performed by the memory management system for the virtual memory system of data processing system 8, in accordance with a preferred embodiment of the present invention. The Effective Address Space represents the address space in which the plurality of processes operating on processor units 10 operate independently of each other. Shown are three processes P1, P2, and P3, each with their own logical address spaces. For each process, a page or block in its addressable space is addressed by an effective address. As shown in FIG. 2, effective addresses within the Effective Address Space of the currently loaded pages in the Physical Address Space are shown as P1-EA, P2-EA, and P3-EA for the three executing processes. Each effective address is a 64-bit address that is translated by the Segment Table Translation 204. The Segment Table Translation 204 is performed by a segment look aside buffer (SLB) or segment look aside registers (SLR) within processor core 14. Each addressable space within the effective address spaces P1, P2, and P3 is translated by the SLB or SLR into 80-bit virtual addresses within Virtual Address Space 206. Thus, P1-EA, P2-EA, and P3-EA are translated by the Segment Table Translation into P2-VA, P1-VA, and P3-VA, respectively. Using the translation lookaside buffer (TLB) within processor core 14, each virtual address space P1-VA, P2-VA, and P3-VA is then translated by Page Table Translation 208 into Real Address Space 210 such that each of the 80-bit virtual addresses P1-VA, P2-VA, and P3-VA are translated into their 64-bit real addresses P1-RA, P2-RA, and P3-RA, representing the real addresses within the system memory. A real address RA is normally constituted by two fields, a field that codes a physical page number into a number i of bits, for example high-order bits, and a field that codes a shift from the start of a physical page into a number j of bits, for example low-order bits. The power of two of the number j indicates the size of a page, for example a number j equal to twelve indicates a page size of four kilobytes. The power of two of the number i indicates the physical memory size in numbers of pages, for example a number i equal to twenty indicates a number of one physical megapage, or four gigabytes of physical memory.

Figure 3:
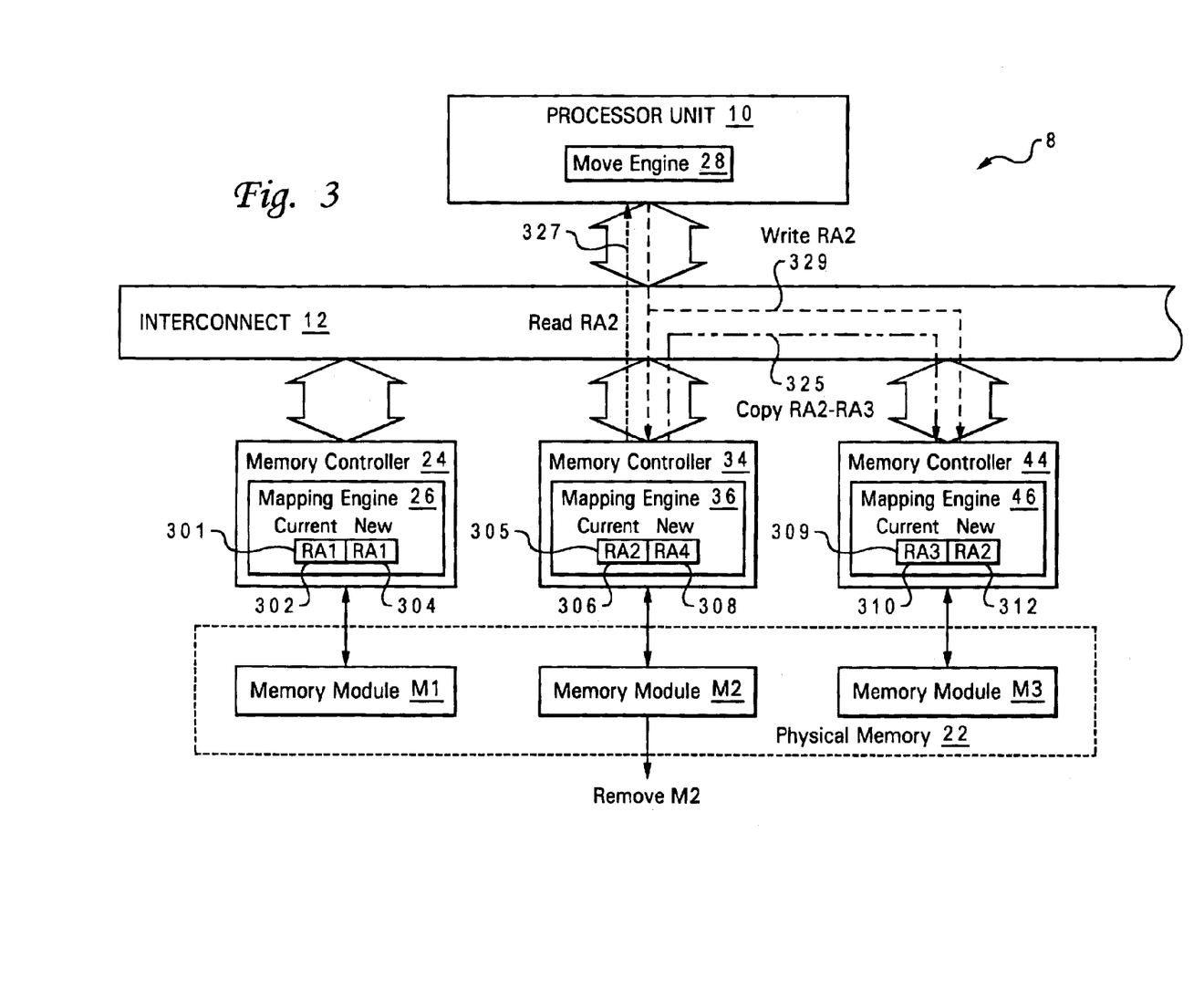
FIG. 3 shows a simplified diagram of the data processing system shown in FIG. 1 for an embodiment where a memory module is being removed from physical memory system, in accordance with the preferred embodiment of the present invention.

As shown in FIG. 3, memory controllers 24, 34, and 44 perform a physical mapping of the real address to access the requested pages in memory modules M1, M2 and M3. If the addressed pages in the Real Address Space 210 are not found in the L1 caches 16, 18, and L2 cache 20, a memory access is requested over interconnect 12. Upon detecting a memory access request in the interconnect 12, each memory controller 24, 34, 44 checks the real address space addressed by the memory access. The high-order bits of the real address from the processor unit 10 are decoded by memory controllers 24, 34 and 44, which identifies the addressable real space of each memory controller's corresponding memory module M1, M2, M3. Each memory controller 24, 34 and 44 contains a mapping engine 26, 36, 46, respectively, that enables it's associated memory controller to respond to memory accesses addressed to its corresponding memory module. Each mapping engine 26, 36, 46 provides a configurable assignment of the real address space (specifically the high-order real address bits) that select the coupled memory module, which effectively changes the base address of each memory device. If the real address of the memory access is that of a resource resident in its corresponding memory module (as determined by a number of higher-order bits of the real address), and this resource is up-to-date, the particular memory controller responds to the request via interconnect 12.

In accordance with a preferred embodiment, physical mapping 212 is then performed by memory controllers 24, 34 and 44. Physical mapping 212 translates the real addresses for the address pages P1-RA, P2-RA, and P3-RA and maps them into the corresponding physical addresses, P1-PA, P2-PA, and P3-PA, respectively, representing the physical addresses of those requested pages within the corresponding memory modules M1, M2 and M3. The physical address indicates the specific memory location within the memory module storing the addressed information. For example, P2-PA specifies the specific row and column addresses to uniquely identify the addressed page in memory module 2. This physical mapping mechanism is invisible from the operating system OS, which views all of the physical memory resources by means of their real addresses without a priori distinguishing the locality of these resources to a particular memory module M1, M2 and M3 in system memory 22.

Referring back to FIG. 3, move engines 28 and mapping engines 26, 36 and 46 provide the virtualization function of the physical memory to allow efficient re-configuration of the physical memory 22, in accordance with the preferred embodiment. When physical memory 22 is re-configured, such as when one of memory modules M1, M2 and M3 are inserted, removed or replaced in the system, move engine 28 performs a data transfer between the memory modules of physical memory 22. Mapping engines 26, 36, 46 control the real-to-physical addressing of memory modules M1, M2, M3 to allow the addition, subtraction or substitution of a particular memory module. This memory management is done efficiently at the hardware/firmware level, requiring little operating system resources to accomplish the re-configuration of physical memory.

FIG. 3 illustrates an embodiment where a memory module is being removed from physical memory in a simplified drawing of data processing system 8. As will be explained, the processor's move engine works in conjunction with the associated mapping engines to take the associated memory module off-line prior to its physical removal. Generally, the move engine copies the contents of the memory module to be removed into the remaining memory modules of physical memory. Then, the real address of the old memory module is re-assigned to the new memory module receiving the copied contents.

In this example, memory module M2 is being removed from data processing system 8. As a first step, processor unit 10 reports to the operating system that its total available physical memory has now been reduced by one memory module. For example, if each memory module M1, M2, M3 is a 64 Giga-Byte (GB) memory device, the operating system would be informed that its available physical memory is now 128 GB. The operating system immediately begins to swap out pages to reduce the amount of stored data accordingly. Processor unit 10 notifies move engine 28 and mapping engines 26, 36, 46 that memory module M2 is being removed from physical memory 22. Move engine 28 immediately selects the remaining module or modules that will be used to store the data contained in memory module M2.

Each of mapping engines 26, 36, and 46 contain registers 301, 305, 309, respectively, storing a "current" real address for its associated memory module and a "new" real address for its associated memory module (as used herein, the real address refers to the entire real address or that portion (for example, the higher-order bits) needed to uniquely identify an associated memory module storing data addressed by the indexed block of memory). As seen in FIG. 3, mapping engine 26 contains a register 301 having a field 302 containing the current real address of memory module M1, and a field 304 containing the new real address for memory module M1. Similarly, mapping engine 36 contains a register 305 having field 306 containing the current real address of memory module M2 and a field 308 containing the new real address of memory module M2. Mapping engine 46 contains a register having field 310 containing the current real address of memory module M3 and a field 312 containing the new real address of memory module M3.

Move engine 28 loads each register 301, 305, 309 as necessary to perform the memory re-configuration. Field 302 shows that memory module M1's current real address is RA1. Field 304 contains the new real address for memory module M1, and shows that it remains the same at RA1. Mapping engine 36 contains field 306, showing the current real address of memory module M1 as RA2. For its new real address, memory module M2 is given a real address that is outside the total real address space currently allocated to the physical memory system. Thus, for example, field 308 contains a new real address for memory module M2, that is RA4, which is outside the current real address space (e.g. 0–128 GB) as mapped to the real addresses (i.e. RA1-RA2). Similarly, move engine 28 has assigned memory module M3 the previous real address of memory module M2, as shown in field 312, indicating memory module M3's new real address as RA2. Field 310 shows memory module M3's current real address of RA3, which is now outside the addressable real space for the operating system.

In the example shown in FIG. 3, move engine 28 selects memory module M3 to receive the data stored in memory module M2. Memory module M1 remains on-line and does not receive any data from memory module M2. Move engine 28 copies all storage in memory module M2 into memory module M3. In an alternative embodiment, move engine 28 copies a portion of memory module M2's content into memory module M3 and the remainder in other memory modules of memory system 22 (for example, memory module M1). Move engine 28 copies all storage in memory module M2 addressed by real address RA2 into memory module M3 addressed by real address RA3, as is shown by path 325.

During the process of moving the memory storage, memory controllers 24, 34, and 44 continue to respond to memory access requests over interconnect 12. During the transition of data, mapping engines 26, 36, 46 enable their respective memory controller to respond and service requests such as "Reads" and "Writes" that are addressed to their current real address, as indicated by the current real address field 302, 306, 310, and provide a mapping to the physical addresses for memory modules M1, M2, M3 to execute such memory accesses directed to their current real address space.

In the example of FIG. 3, memory module M2 would continue to respond to Reads addressed to real address RA2, as illustrated by path 327. In accordance with the preferred embodiment, mapping engine 26, 36, 46 would enable their associated memory controller to service and respond to any Write requests to either its current real address or its new real address, as indicated by their current and new real address fields, respectively. Accordingly, as illustrated by path 329 in FIG. 3, a Write to real address RA2 would be handled by both memory controllers 34 and 44 because memory module M2's current real address in field 306 is RA2 and memory module M3's new real address in field 312 is RA2. The memory system is assured to have coherency throughout the move process because memory writes to RA2 continue to be stored in both memory modules M2 and M3.

Upon completion of the data transfer from memory module M2 to memory module M3, move engine 28 updates registers 301, 305, 309 by copying the new real addresses into the current real address fields 302, 306, 310, effectively interchanging the old address to the new address as a concluding step. Memory module M1 is now addressed by real address RA1 and memory module M3 is now addressed by real address RA2. Mapping engine 46 now performs a physical mapping of real addresses in the RA2 space into memory module M3, thereby creating a virtualized physical mapping from the addressable real address space being utilized by the operating system into a virtual physical address space.

Figure 4:
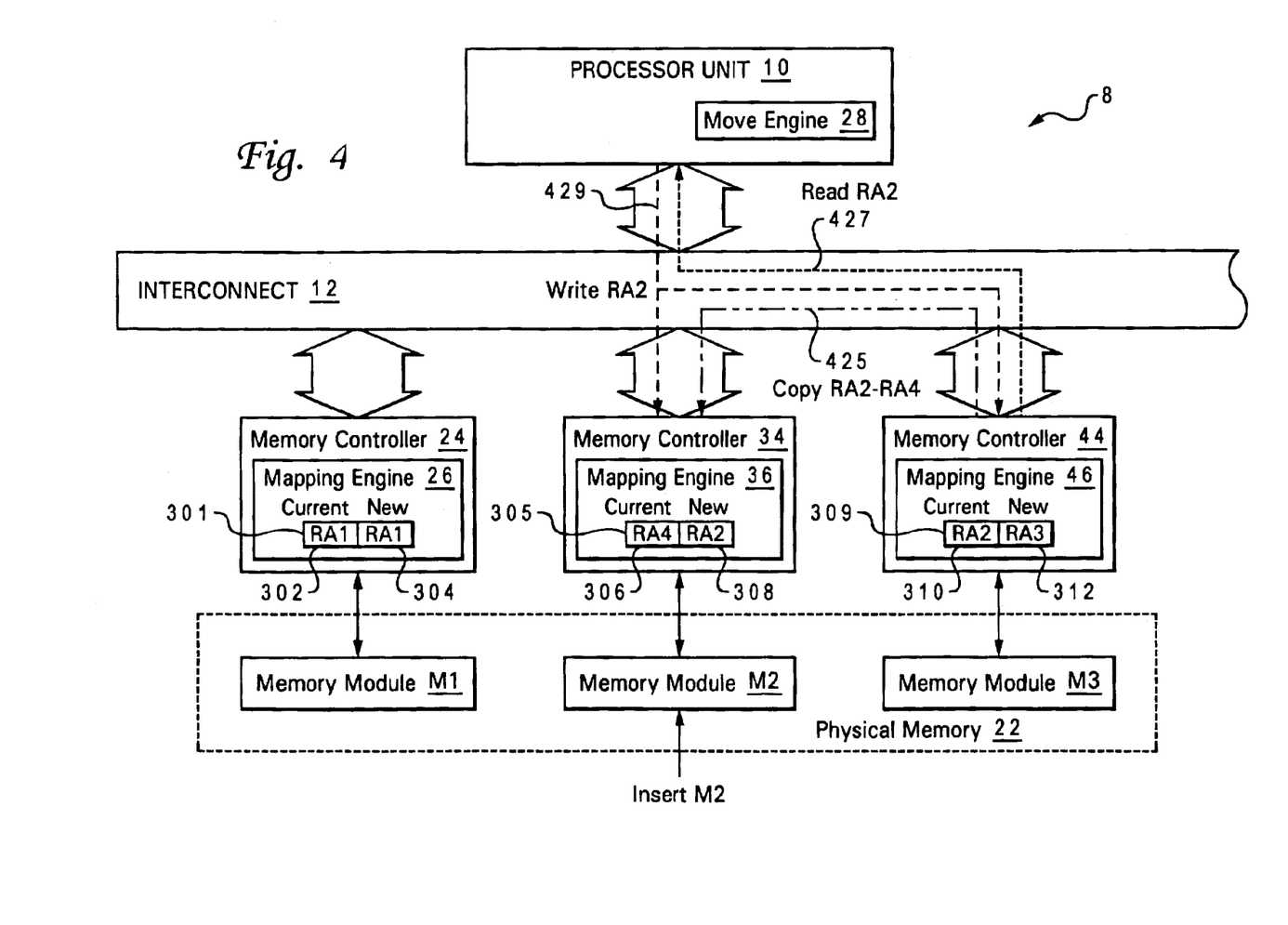
FIG. 4 shows a simplified diagram of the data processing system shown in FIG. 1 for an embodiment where a memory module is being removed from physical memory system, in accordance with the preferred embodiment of the present invention.

With reference now to FIG. 4, there is shown a simplified block diagram of data processing system 8 and depicts a memory module M2 being inserted into physical memory 22. Processor unit 10 notifies move engine 28 and mapping engines 26, 36, 46 that a memory module is being added to physical memory 22 and will be inserted into a memory slot associated with and controlled by memory controller 34. The current real address space for data processing system 8 at this point is comprised of the physical memory of memory modules M1 and M3 and is addressed by the real address space RA1-RA2.

Each register 301, 305, 309 is programmed with respective current and new real addresses in accordance with a preferred embodiment. Memory module M1's real address is not re-programmed and its real address in fields 302 and 304 remains the same at real address RA1. Memory module M2 is programmed with a current real address of RA4 in field 306 and a new real address RA2 in field 308. The current real address assigned to memory module M2 is programmed with the current real address RA4 because it is outside the current real address space of physical memory 22. The physical mapping for memory module M3 is programmed with a current real address RA2 in field 310 and a new real address RA3 in field 312. As will be appreciated, the real address selected for each field is dependent on the size of the memory module M2 being inserted and the size of the existing memory module M3. In this example, they are assumed to be of equal size. In the event that they are different sizes, the real address for memory module M3 would be selected to fall on the memory boundary of memory module M2 to provide a contiguous real memory space.

After memory module M2 is physically inserted into physical memory 22, and after loading the registers, move engine 28 begins copying the contents of memory module M3 into memory module M2 by making memory access requests over interconnect 12 to memory controller 44 to copy each memory cell of memory module M3 into the memory address space at real address RA4. Memory controller 34 is enabled to respond to Writes addressed to its current real memory, programmed in field 306 as current real address RA4. Mapping engine 36 receives writes from each memory cell of memory module M3 and maps them into the physical address space of memory module M2. This is depicted in FIG. 4 by path 425 showing a copy of memory cells at real address RA2 into the memory cells at real address RA4.

During the move process, mapping engines 36 and 46 are programmed to respond to memory accesses at both the current real addresses and new real addresses programmed into their registers 305 and 309, respectively. As shown in FIG. 4, a read memory access from processor unit 10 directed to real address RA2 is serviced by the memory controllers 24, 34, 44 storing current real address RA2. Here, all reads will be directed to memory controller 44, which is storing RA2 in field 310, as indicated by path 427.

All memory requests from processor 10 (or other device such as a Direct Memory Access device) over interconnect 12 to real address RA2 will cause any memory controllers 24, 34, 44 storing either a current or a new real address in registers 301, 305, 309 to write the received data into its coupled memory module by physically mapping into the corresponding row and column physical address. As shown in FIG. 4, a write request from processor unit 10 to real address RA2 is show by path 429 to be received by both memory controllers 34 and 44 causing each of memory modules M2 and M3 to be updated by the written data. As will be appreciated, this mechanism allows for memory coherency during the move process.

Once the memory module copy process has completed, move engine 28 directs memory controllers 24, 34, 44 to respond to memory accesses from interconnect 12 at their new real addresses in fields 304, 308, 312, respectively. The operating system is then notified that the real address space of the system has been increased by an amount equal to the addressable space of memory module M2. The operating system will then begin to store and access memory pages across the real address space RA1-RA3 of memory modules M1, M2, and M3.

As will be appreciated there are cases where the memory module being inserted matches the memory boundry of the existing memory and the real address space does not have to be reconfigured. Thus, in an alternative embodiment, the memory move process is not performed and the mapping engine for the new module is immediately programmed with the real address associated with the newly added real address space. For example, if memory module M2 as shown in FIG. 4 is being added to physical memory 22, fields 306 and 308 would each be programmed with real address RA3. Fields 310, 312 of register 309 would each be programmed with real address RA2. In this case, the data stored in memory module M3 is not copied to memory module M2 and remains in memory module M3. Because the mapping engines in the preferred embodiment allow for the programming of the real address for each of the memory modules, the fact that memory module M2 is physically located between memory modules M3 and M1 does not prevent memory module M2 from being programmed to respond within real address space RA3. Once memory module M2 has been added in its memory slot within physical memory 22, the operating system is notified that its real address space has been increased by an amount equal to the memory storage of memory module M2 and memory controller 34 immediately begins to respond to memory accesses into real address RA3.

For the case of replacement of a memory module in the physical memory 22, the memory module is removed from physical memory 22 in accordance with the process described in conjunction with FIG. 3, and then a new memory module is inserted back into the physical memory in accordance with the process described in conjunction with FIG. 4. Also, with reference now back to FIG. 1, mapping engine 56 within input/output connector 52 operates in the same manner as mapping engines 26, 36, 46. Input/output connector 52 operates in a similar manner as processor unit 10 when performing direct memory access operations to a memory module being reconfigured in accordance with the preferred embodiment. As will be appreciated, the system may have additional input/output connectors, equal to input/output connector 52, connected to interconnect 12. As various input/output devices, such as disk drives and video monitors, are added and removed on PCI bus 58 (or other similar attached buses), mapping engine 56 would operate in conjunction with move engine 28 in the same fashion as described above with respect to the removal and addition of memory modules in physical memory 22 to allow for the virtualization of the physical addresses to such input/output devices.

As will be appreciated, the preferred embodiment provides for a memory module to be inserted, removed or replaced in physical memory 22 without the operating system having to direct and control the reconfiguration of physical memory to accomplish the physical memory change. In the preferred embodiment, move engine 28 and mapping engines 26, 36, 46 work in conjunction to transparently reconfigure the physical memory to accomplish the addition, subtraction, or replacement of a particular memory module in the physical memory. The mapping engine registers store current and new real addresses that allow the move and mapping engines to virtualize the physical addresses for each of the memory modules and provide the reconfiguration and manipulation of the stored data in real-time through the use of hardware functionality and not software. As will further be appreciated, because the virtualization of physical memory occurs at the memory controller level of the memory hierarchy, reconfigurations of multiple memory modules can be performed simultaneously while normal memory operations continue to operate on interconnect without special handling by the operating system or system processors.

While the invention has been particularly shown and described with reference to a preferred embodiment, it will be understood by those skilled in the art that various changes in form and detail may be made therein without departing from the spirit and scope of the invention.

What is claimed is:

1. A method of data processing within a data processing system, wherein the data processing system including a processor device for generating memory accesses containing physical addresses associated with memory locations of a physical memory system for reading and writing of data thereto, the physical memory system including a plurality of memory controllers, each responding to memory accesses requested by the processor by writing and reading memory blocks stored within one or more memory modules coupled thereto, the method comprising:

setting a register in each of a first and a second memory controller of the plurality of controllers that are to be reconfigured, wherein a first and a second memory module is coupled to the first and second memory controller, respectively, each register being set to indicate a current real address and a new real address for the coupled memory module, and wherein the first and second memory controllers each respond to memory accesses addressed to the current real address stored in their respective registers;

copying the plurality of memory blocks from the first memory module to the second memory module based on the current real addresses of the first and second memory modules wherein, during the copying step, each memory controller of the plurality of memory controllers responds to write memory requests addressed to the current real address or the new real address stored in the memory controller's register such that a write memory request addressed to either of said current or new real addresses is responded to by all memory controllers of the plurality of memory controllers containing that real address in its set register; and after completing the copying step, configuring the first and second memory controllers to respond only to memory accesses addressed to the new real address stored in their respective registers.

2. The method of claim 1, wherein the first memory module is inserted into the memory system prior to the copying step and wherein the current real address for the first memory module is within a current addressable space for the physical memory system and the new real address for the second memory module is outside a current addressable space for the physical memory system.

3. The method of claim 1, the method further comprising notifying the processor that a configuration of the plurality of memory modules is being modified, and wherein the setting step is performed in response to the notification.

4. The method of claim 1, wherein, during the copying step, each memory controller of the plurality of memory controllers responds to a read memory access addressed to only the current real address stored in the memory controller's register.

5. A method of data processing within a data processing system, wherein the data processing system including a processor device for generating memory accesses containing physical addresses associated with memory locations of a physical memory system for reading and writing of data thereto, the physical memory system including a plurality of memory controllers, each responding to memory accesses requested by the processor by writing and reading memory blocks stored within one or more memory modules counted thereto, the method comprising:

setting a register in each of a first and a second memory controller of the plurality of controllers that are to be reconfigured, wherein a first and a second memory module is counted to the first and second memory controller, respectively, each register being set to indicate a current real address and a new real address for the coupled memory module, and wherein the first and second memory controllers each respond to memory accesses addressed to the current real address stored in their respective registers;

copying the plurality of memory blocks from the first memory module to the second memory module based on the current real addresses of the first and second memory modules; and after completing the copying step, configuring the first and second memory controllers to respond only to memory accesses addressed to the new real address stored in their respective registers, wherein the first memory module is removed from the memory system following the configuring step, the current real address for the first memory module is within a current addressable space for the physical memory system, and the new real address for the first memory module is outside a current addressable space for the physical memory system.

6. A system having a processor device for generating memory accesses containing real addresses associated with memory locations of a physical memory system for reading and writing of data thereto, and a plurality of memory modules in the physical memory system for storing the data as a plurality of memory blocks, each memory block comprising contiguous bytes of physical memory, the system comprising:

a plurality of memory controllers, wherein each memory controller of the plurality of memory controllers has one or more memory modules of the plurality of memory modules coupled thereto, and wherein each memory controller of the plurality of memory controllers responds to memory accesses by writing and reading memory blocks stored within the one or more of the memory modules coupled thereto;

a first register within a first memory controller of the plurality of memory controllers having a first field storing a current real address corresponding to a first memory module of the plurality of memory modules coupled thereto and a second field storing a new real address corresponding to the first memory module;

a second register within a second memory controller of the plurality of memory controllers having a first field storing a current real address corresponding to a second memory module of the plurality of memory modules coupled thereto and a second field storing a new real address corresponding to the second memory module;

a move engine that, in response to a notification that a configuration of the first and second memory modules is being modified, copies the plurality of memory blocks from the first memory module to the second memory module based on the current real addresses of the first and second memory modules;

a first mapping engine within the first memory controller that enables the first memory controller to respond to memory accesses addressed to the current real address stored in the first register during a time period that the move engine is copying the plurality of memory blocks from the first memory module to the second memory module and that enables the first memory controller to only respond to memory accesses addressed to the new real address stored in the first register after the time period that the move engine is copying the plurality of memory blocks from the first memory module to the second memory module; and a second mapping engine within the second memory controller that enables the second memory controller to respond to memory accesses addressed to the current real address stored in the second register during a time period that the move engine is copying the plurality of memory blocks from the first memory module to the second memory module and that enables the second memory controller to only respond to memory accesses addressed to the new real address stored in the second register after the time period that the move engine is copying the plurality of memory blocks from the first memory module to the second memory module.

7. The system of claim 6, wherein the first and second mapping engines enable their respective memory controllers to respond to write memory accesses addressed to either the current real address or the new real address stored in their respective registers during a time period that the move engine is copying the plurality of memory blocks from the first memory module to the second memory module.

8. The system of claim 6, wherein the first memory module is removed from the physical memory system after the second mapping engine enables the second memory controller to only respond to memory accesses addressed to the new real address stored in the second register after the time period that the move engine is copying the plurality of memory blocks from the first memory module to the second memory module.

9. The method system of claim 8, wherein the new real address stored in the second register is equivalent to the current real address stored in the first register and the new real address stored in the first register is outside the current addressable space of the physical memory system.

10. The system of claim 6, wherein the second memory module is inserted into the physical memory system before the move engine copies the plurality of memory blocks from the first memory module to the second memory module.

11. The system of claim 10, wherein the new real address stored in the second register is equivalent to the current real address stored in the first register and the new real address stored in the first register is within the current addressable space of the physical memory system.

12. The system of claim 6, wherein the first and second mapping engines enable their respective memory controllers to respond to read memory accesses addressed to only the current real address stored in their respective registers during a time period that the move engine is copying the plurality of memory blocks from the first memory module to the second memory module.

13. A data processing system comprising:

a physical memory system having a plurality of memory modules for storing data as a plurality of memory blocks, each memory block comprising contiguous bytes of physical memory;

a plurality of processor devices for generating memory accesses containing real addresses associated with memory locations of the physical memory system for reading and writing of data thereto;

a plurality of memory controllers, wherein each memory controller of the plurality of memory controllers has one or more memory modules of the plurality of memory modules coupled thereto, and wherein each memory controller of the plurality of memory controllers responds to memory accesses by writing and reading memory blocks stored within the one or more of the memory modules coupled thereto;

a first register within a first memory controller of the plurality of memory controllers having a first field storing a current real address corresponding to a first memory module of the plurality of memory modules coupled thereto and a second field storing a new real address corresponding to the first memory module;

a second register within a second memory controller of the plurality of memory controllers having a first field storing a current real address corresponding to a second memory module of the plurality of memory modules coupled thereto and a second field storing a new real address corresponding to the second memory module;

a move engine that, in response to a notification that a configuration of the first and second memory modules is being modified, copies the plurality of memory blocks from the first memory module to the second memory module based on the current real addresses of the first and second memory modules;

a first mapping engine within the first memory controller that enables the first memory controller to respond to memory accesses addressed to the current real address stored in the first register during a time period that the move engine is copying the plurality of memory blocks from the first memory module to the second memory module and that enables the first memory controller to respond to memory accesses addressed to the new real address stored in the first register after the time period that the move engine is copying the plurality of memory blocks from the first memory module to the second memory module; and a second mapping engine within the second memory controller that enables the second memory controller to respond to memory accesses addressed to the current real address stored in the second register during a time period that the move engine is copying the plurality of memory blocks from the first memory module to the second memory module and that enables the second memory controller to respond to memory accesses addressed to the new real address stored in the second register after the time period that the move engine is copying the plurality of memory blocks from the first memory module to the second memory module.

14. The system of claim 13, wherein the first and second mapping engines enable their respective memory controllers to respond to write memory accesses addressed to either the current real address or the new real address stored in their respective registers during a time period that the move engine is copying the plurality of memory blocks from the first memory module to the second memory module.

15. The system of claim 13, wherein the first memory module is removed from the physical memory system after the second mapping engine enables the second memory controller to only respond to memory accesses addressed to the new real address stored in the second register after the time period that the move engine is copying the plurality of memory blocks from the first memory module to the second memory module.

16. The system of claim 15, wherein the new real address stored in the second register is equivalent to the current real address stored in the first register and the new real address stored in the first register is outside the current addressable space of the physical memory system.

17. The system of claim 13, wherein the second memory module is inserted into the physical memory system before the move engine copies the plurality of memory blocks from the first memory module to the second memory module.

18. The system of claim 17, wherein the new real address stored in the second register is equivalent to the current real address stored in the first register and the new real address stored in the first register is within the current addressable space of the physical memory system.

19. The system of claim 13, wherein the first and second mapping engines enable their respective memory controllers to respond to read memory accesses addressed to only the current real address stored in their respective registers during a time period that the move engine is copying the plurality of memory blocks from the first memory module to the second memory module.

* * * * *

UNITED STATES PATENT AND TRADEMARK OFFICE
CERTIFICATE OF CORRECTION

PATENT NO. : 6,907,494 B2  Page 1 of 1
DATED : June 14, 2005
INVENTOR(S) : Ravi Kumar Arimilli et al.

It is certified that error appears in the above-identified patent and that said Letters Patent is hereby corrected as shown below:

<u>Column 12,</u>
Line 27, delete "counted" and insert -- coupled --.

<u>Column 13,</u>
Line 60, delete "method system" and insert -- system --.

Signed and Sealed this

Sixteenth Day of May, 2006

JON W. DUDAS
*Director of the United States Patent and Trademark Office*